Oct. 22, 1935.                    E. DU BOIS                    2,018,608
           APPARATUS FOR THE TRANSPORTATION AND CONSERVATION OF ICE CREAM
                              Filed April 15, 1931
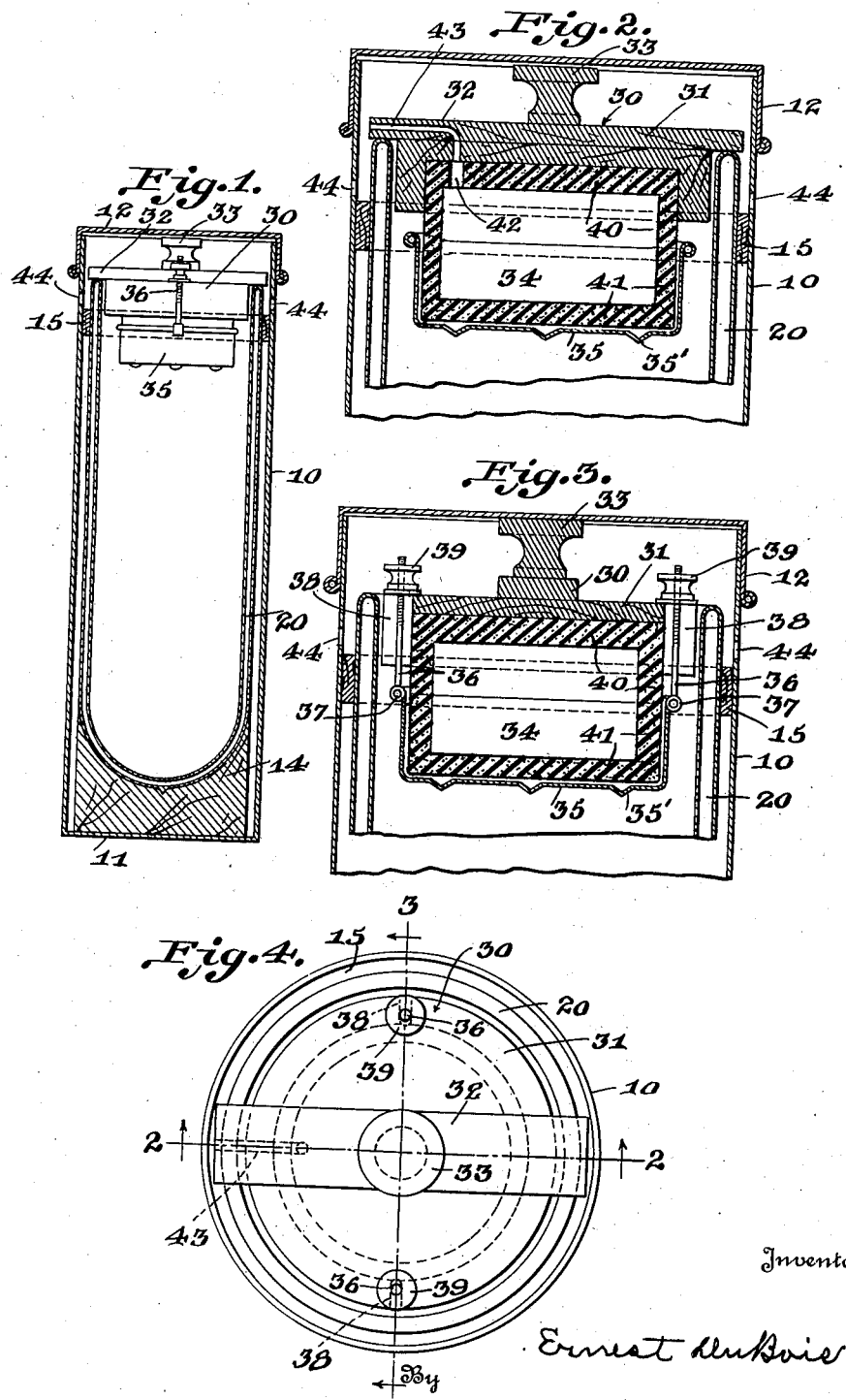
Inventor
Ernest DuBois
By Hubert Pick  Attorney Patented Oct. 22, 1935

2,018,608

UNITED STATES PATENT OFFICE 2,018,608

APPARATUS FOR THE TRANSPORTATION AND CONSERVATION OF ICE CREAM

Ernest Du Bois, Itterbeek, Belgium, assignor to International Carbonic Engineering Company, Kennett Square, Pa., a corporation of Delaware Application April 15, 1931, Serial No. 530,368
In Belgium June 7, 1930

17 Claims. (Cl. 62—91.5)

This invention relates to certain improvements in apparatus for the transportation and conservation of ice cream; and the nature and objects of the invention will be readily recognized and understood by those skilled in the art from the following explanation and detailed description of the accompanying drawing illustrating what I at present consider to be the preferred embodiments or mechanical expressions of my invention from among various other forms, arrangements, embodiments, combinations and constructions of which the invention is capable within the spirit and the scope thereof.

My present invention is primarily directed to the problems of transporting and delivering ice cream in relatively small quantities to the consumer, and of efficiently conserving the ice cream and maintaining the same in proper condition over considerable periods of time in the hands of the consumer prior to the consumption and use thereof; and a main object of my invention is to provide a design, arrangement and construction of refrigerating and ice cream conserving container of relatively small, readily portable and easily stored design and size for receiving the quantity of ice cream to be delivered to the consumer, and into which the ice cream can be placed at the consumers or point of delivery, and refrigerated and maintained in the desired and proper condition through the efficient utilization of the high refrigerating and cold producing effect of solid carbon dioxide which is employed as the refrigerant for the container and the ice cream contained therein.

Another object of the invention is the production of such a solid carbon dioxide refrigerated and ice cream conserving container which is of relatively simple construction but of high thermal efficiency; which is readily charged with a supply of solid carbon dioxide, and which when so charged secures and utilizes the maximum refrigerating effect of the solid carbon dioxide, with a highly efficient disposition of the carbon dioxide gas evolved from the sublimation of the charge of solid carbon dioxide.

The invention includes and is further characterized by a method of refrigerating, transporting, and delivering ice cream to, and for refrigeration and conservation in the hands of, the consumer in the desired quantity, in which method the ice cream is formed at the ice cream plant into refrigerated portions or blocks of the quantity to be delivered, is then transported while subjected to suitable refrigeration to the point of distribution to the consumer, where it is then placed in one of the solid carbon dioxide refrigerated containers of the invention of a size to properly receive and refrigerate the same, and in which it is retained by the consumer and conserved in the proper condition until the time for consumption.

With the foregoing general objects and results in view, as well as certain others which will be readily understood from the following explanation, the invention consists in certain novel features in construction and in combination and arrangement of parts, as well as in the sequence and relation of steps of the method involved, all as will be more fully and particularly referred to and specified hereinafter.

Referring to the accompanying drawing, in which similar reference characters refer to corresponding parts throughout the several figures thereof:

Fig. 1 is a vertical section through a solid carbon dioxide refrigerating ice cream container of my invention, showing the arrangement of the vacuum vessel or receptacle and casing therefor, together with the solid carbon dioxide carrying top closure for the receptacle shown in side elevation.

Fig. 2 is an enlarged vertical section through the upper end of the container and the carbon dioxide carrying top closure or cover, taken as on the line 2—2, of Fig. 4.

Fig. 3 is a view similar to Fig. 2, but taken as on the line 3—3 of Fig. 4.

Fig. 4 is a view in top plan of the container of Fig. 1 with the container casing cover removed and showing the carbon dioxide carrying top closure in refrigerating position on the vacuum vessel or receptacle.

One possible form and embodiment of which my invention is capable, is disclosed in the accompanying drawing purely by way of example and not of limitation, for the purpose of explaining the principles and features of my invention to enable those skilled in the arts to which it relates to understand the same. In accordance with the invention, the solid carbon dioxide refrigerated container includes an outer casing 10 having the cover 12; an inner ice cream receiving and heat insulated open upper end receptacle or vessel 20 mounted and confined therein; and the solid carbon dioxide carrying top or upper end closure 30 removably mounted and fitted into the open upper end of the ice cream vessel or receptacle 20 for refrigerating the contents thereof.

The outer casing 10 is preferably formed of metal, of generally cylindrical shape although not so limited, with the closed bottom 11 and open top or upper end normally closed by the removable slip or other suitable type of cover 12. The heat insulated inner vessel or receptacle 20, referring now to Fig. 1 of the drawing, has an external diameter less than the internal diameter of casing 10, and is mounted axially therein and supported at its lower end on a base or support 14 secured in the lower end of casing 10 on the bottom 11 thereof. The vessel or receptacle 20 extends upwardly through casing 10 to, and terminates in the open upper end spaced a distance below the upper end of the casing 10, and is spaced throughout its length from the casing to form a space completely therearound between the adjacent receptacle and casing walls. The vessel or receptacle 20 is maintained in position against displacement in casing 10 and in spaced relation therewith, by the support 14 at its lower end, and at its upper end by a ring or annulus 15, preferably of rubber or such like material, which spacing and retaining ring is positioned between casing 10 and the vessel 20 adjacent the upper end thereof, and forms the further function of an upper end closure for the space around receptacle 20 within casing 10.

The ice cream receiving vessel or receptacle 20 is preferably, as shown in the example hereof, of the well known double walled vacuum, so-called, type formed of any of the suitable or desired materials. The invention however is not limited to the use of the vacuum type of ice cream receptacle, as other forms and types of heat insulating walls may be employed, or the receptacle can be of usual types of construction without regard to heat insulation where the higher degrees of efficiency may not be of consequence.

The top cover or closure 30 for the open upper end of the inner vessel 20 is, following the teaching of my invention, utilized for the generation of the refrigeration for conserving the contents of the receptacle, through supplying such top cover with a charge of solid carbon dioxide and permitting the same to sublime therein while carrying off the gas evolved. In the present instance I happen to disclose the top closure 30 as including the cylindrical block or body 31 of wood, or any other suitable material of a diameter slightly less than the internal diameter of the open upper end of the vessel or receptacle 20, so as to enter freely thereinto and substantially close the same. A supporting and positioning cross bar or member 32 is secured to the upper side of closure block 31 and extends diametrically thereacross and a distance beyond opposite sides thereof, so as to engage and rest upon the upper edge of receptacle 20 at opposite sides thereof, and thus removably support and position the closure block 31 in and substantially closing the upper end of the vessel or receptacle 20. At a central point on cross bar 32 and axially of closure block 31, a handle or knob 33 is secured, of a height such as not to interfere with proper closing of the cover 12 onto the casing 10. The opposite ends of the cross bar 32 terminate short of, and form a space between such ends and, the adjacent casing walls, to permit free removal and insertion of the top closure 30 through the open upper end of casing 10, from and to operative position in the upper end of vessel or receptacle 20.

A closed solid carbon dioxide receiving and holding compartment 34 is formed and provided at the under side of top closure 30, for positioning thereby within vessel or receptacle 20, to refrigerate the ice cream or other contents therein. In the particular mechanical expression of the present example, the carbon dioxide compartment 34 is formed in the following manner. An open container 35 is removably suspended from the block 31 of top closure 30 in position spaced therebelow, by the bolts 36 pivotally connected at their lower ends at 37 to diametrically opposite points on the upper edge of container 35. The block 31 is formed with the diametrically opposite radially disposed and alined grooves or vertical slots 38 into and through which bolts 36 extend upwardly, respectively. The upper ends of bolts 36 are provided with the nuts 39 threaded thereon above and resting on block 31 to support and maintain container 35 in suspended position. The under side of block 31 is cut away to form a cavity therein of the same width or diameter as and axially alined with container 35, and this cavity or recess is provided with an insulating lining 40 of preferably a material such as sponge rubber, the side walls of which lining depend, in the specific example hereof, a distance below the block 31. The container 35 is provided with a similar lining, of preferably sponge rubber 41, the side walls of which are vertically alined with the walls of lining 40, so that when the container 35 is drawn upwardly by bolts 36, the edges of linings 40 and 41 engage and under pressure exerted thereon by bolts 36, form a seal to provide in effect a sectional, seated container of sponge rubber or other insulating material to provide the solid carbon dioxide receiving and refrigerating chamber 34 therewithin.

In order to secure the refrigerating effect of solid carbon dioxide within compartment 34, an outlet for the carbon dioxide gas evolved by the sublimation in compartment 34 must be provided. My invention in the illustrated example discharges the gas from compartment 34, to the outside of the vessel 20, through a gas port 42 in the insulating lining 40 forming the upper wall of the compartment, which port is alined with and opens into a duct or passage 43 extending upwardly through block 31 to and then outwardly through cross bar 32 to and discharging through one end thereof into the casing 10 above vessel or receptacle 20. In order that the gas discharged by duct 43 into casing 10 may escape from the container to atmosphere, a series of discharge ports or openings 44 are formed in and through the casing wall above the spacing ring 15, but below the position of the lower edge of the skirt of casing cover 12 when such cover is in casing closing position.

In using the refrigerating container above described, the casing cover 12 and refrigerating top closure 30 for receptacle 20, are removed and the ice cream is placed within the vacuum insulated receptacle. The container 35 of top closure 30 is removed by releasing bolts 36 from the slots 38 in block 31, and the required quantity of solid carbon dioxide is then placed in container 35, the container bottom being provided with the supporting feet or the like 35' so that the container can be rested upon a table or other supporting surface if desired, without material heat transfer from the supporting surface to the container. With the solid carbon dioxide in container 35, the container is mounted and positioned onto block 31 by bolts 38, with the carbon dioxide substantially sealed and enclosed within the compartment 34 formed by the joined insulating linings 40 and 41. When thus charged with the refrigerant, top closure 30 is mounted in position in and substantially closing upper end of the ice cream containing receptacle 20, after which cover 12 is placed over and closing the upper end of casing 10.

In refrigerating position in receptacle 20, the solid carbon dioxide evaporates or sublimes directly from the solid to the gaseous state, and the gas is conducted as hereinbefore described, to the atmosphere from chamber 34. The solid carbon dioxide is of course at a very low temperature and refrigerates and maintains the ice cream within receptacle 20 at the desired low temperature to conserve the ice cream in the proper condition for a considerable period of time, dependent primarily upon the quantity and rate of evaporation of the solid carbon dioxide in compartment 34. The intensity of the cooling and refrigerating effect is very high, as the insulation of the top closure 39 is not of course perfect, while the construction is such that the size of chamber 34 permits of the use of a relatively large quantity of solid carbon dioxide.

In the method of refrigerating, transporting and delivering ice cream to the consumer, which utilizes the refrigerating containers of the invention hereinbefore described, the ice cream at the ice cream plant is placed into metal receptacles having internal dimensions approximately corresponding to the internal dimensions of the vessels or receptacles 20 of the refrigerating containers which are to receive the same, and is then frozen into blocks or cakes by placing the metal receptacles in a refrigerating room of very low temperature. After the ice cream is thus frozen, the blocks or cakes thereof are taken from the receptacles and immediately are wrapped in sheets of suitable paper and thus stored in the refrigerating room until they are to be transported to the consumers. The frozen blocks of ice cream in their paper wrappings are transported to the points of delivery in refrigerated trucks or other refrigerated carriers. At each consumer, the refrigerated blocks of ice cream to be delivered are each placed into one of the hereinbefore described refrigerating containers, that is, into the vacuum insulated receptacles 20 thereof, the refrigerating top closures 39 charged with solid carbon dioxide are placed in operative position, and the containers then closed by covers 12. The blocks of ice cream are maintained refrigerated by the solid carbon dioxide and the consumer is thus enabled to preserve the ice cream for a considerable period of time without the use of large, liquid employing coolers, such as the brine coolers well known in the art, and without danger of damage through leakage, as the containers of my invention are absolutely dry and may be kept at any location desired, without possibility of damage to objects in contact therewith or adjacent thereto. As the refrigerating containers are relatively compact with respect to their capacity and refrigerating power, and are of a size and shape readily handle, they are easily moved and readily stored in relatively small spaces at any point convenient to the user.

It is evident that various changes, modifications, variations, substitutions and eliminations might be resorted to without departing from the spirit and scope of my invention, and hence I do not wish to limit myself in all respects to the exact and specific disclosures hereof.

Desiring to protect my invention in the broadest manner legally possible, what I claim is:

1. A refrigerating container comprising a casing having an open upper end, a removable cover for the upper end of the casing, a vacuum insulated vessel having an open upper end positioned within said casing and forming a space therearound between the sides of the casing and the vessel, a member disposed around the vessel adjacent the upper end thereof between the vessel and the casing and closing the space therebetween, a removable closure for the upper end of the vessel and having a solid carbon dioxide receiving compartment at the under side thereof, said closure having a gas escape passage therethrough from the compartment to and discharging into the casing above the vessel, and said casing formed with gas outlet ports therethrough adjacent the upper end of the vessel and above said space closing member between the vessel and casing.

2. In combination, a receptacle having heat insulated walls and an open upper end to receive material to be refrigerated, a removable closure mounted in the upper end of said receptacle, said closure embodying a closure member, and a solid carbon dioxide receiving container removably mounted and positioned on and depending below the under side of the closure member within the receptacle to refrigerate the receptacle contents, said carbon dioxide container open at its upper side and having an insulating material lining, the closure member formed with a recess in its under side alined with the container and having an insulating material lining, the container lining and recess lining engaging to form a seal with the container in attached position on the closure member to thereby provide a closed solid carbon dioxide containing compartment, and the closure member provided with a carbon dioxide gas escape passage from such compartment to and discharging therefrom above the upper end of the receptacle.

3. In combination, a receptacle having an open upper end to receive material to be refrigerated, and a refrigerating closure for the open upper end of said receptacle, embodying a closure member for removable mounting in the receptacle upper end, and a solid carbon dioxide receiving structure at the under side of said closure for positioning thereby within the receptacle, said structure comprising complementary upper and lower sponge rubber sections, and means detachably securing said sections together in sealed relation to form an enclosed carbon dioxide receiving chamber, said closure member including a passage therethrough for conducting gas from the carbon dioxide chamber for discharge to atmosphere.

4. A refrigerating closure for the open end of a container, embodying a closure member, and a solid carbon dioxide receiving and enclosing structure at the under side of said closure member, said structure including upper and lower insulating material sections together forming a closed solid carbon dioxide receiving chamber, a cup-like member of heat conducting material fitting over the lower insulating material section, and fastening means carried by such cup-like member and detachably engaging the closure member to removably secure the insulating material sections together in sealed, solid carbon dioxide chamber forming relation.

5. A refrigerating structure for receiving and holding solid carbon dioxide, including a solid carbon dioxide container formed of complementary sponge rubber sections, and means for detachably securing said sections together in sealed container forming relation, one of said sections having a carbon dioxide gas escape duct therethrough.

6. A refrigerating container for ice cream and the like, embodying an exterior casing having an open upper end, a vacuum insulated vessel of the type having an open end providing a relatively large mouth, said vessel positioned in said casing and of a diameter less than the diameter of the casing to form a space therearound between the casing and the vessel, the upper open mouth end of the vessel disposed a distance below the upper end of the casing, a positioning member around the vessel adjacent the upper end thereof between the vessel and casing and closing the space therebetween, a closure for the open upper end mouth of the vessel, said closure having a solid carbon dioxide container at the under side thereof for positioning in the upper end of the vessel, but closed therefrom, for refrigerating the vessel by conduction, and said closure provided with a passage for conducting carbon dioxide gas from said container to a point within the casing removed from the upper end of the vessel, the casing being formed for escape of gas therefrom to the exterior thereof.

7. A refrigerating container embodying a casing having an open upper end, an open upper end vessel positioned in said casing and forming a space therearound between the sides of the casing and the vessel, the upper end of such space closed completely around the vessel, said vessel having its open upper end below the upper end of the casing, a closure removably mounted on the open upper end of the vessel and having a solid carbon dioxide receiving compartment closed from but in heat exchange relation with the interior of the vessel, said closure having a passage for conducting carbon dioxide gas from said compartment to the casing at the exterior of the vessel for discharge to atmosphere, and a removable cover for the upper end of the casing, said cover in mounted position on the casing preventing vertical displacement of said vessel closure.

8. A refrigerating container embodying a casing having an open upper end, a vessel having an open upper end mounted in said casing, a removable closure structure for the open upper end of said vessel, said closure structure including a solid carbon dioxide receiving chamber closed from but in heat transfer relation with the interior of the vessel, the closure structure having a passage for conducting carbon dioxide gas from the chamber to the exterior of the vessel and within the casing, said casing providing for discharge of gas therefrom to atmosphere, and a removable cover for the open upper end of said casing, said cover extending over and covering the removable closure structure.

9. A refrigerating container embodying a vacuum insulated vessel having an opening thereinto, and a closure for said vessel opening providing a solidified gas refrigerant receiving compartment at the inner side of the closure and closed from communication with the vessel, said closure having a passage therethrough discharging to atmosphere at one side of the vessel opening to conduct gases evolved from solidified refrigerant in said compartment for discharge at a point removed from the vessel opening.

10. A refrigerating container comprising a casing having an open upper end, a vacuum insulated vessel positioned in said casing and forming a space therearound between the sides of the casing and the vessel, a positioning member around the vessel adjacent the upper end thereof, between the vessel and casing and closing the space therebetween, said vessel having an open upper end, a closure for the open upper end of the vessel, said closure having a compartment therein for receiving a solidified gas refrigerant, said closure having a passage therethrough for conducting gases from the refrigerant compartment above the upper end of the vessel into the casing above said positioning member, and a cover over the upper end of the casing, the casing being provided with gas outlets therefrom to atmosphere above said vessel positioning member.

11. An enclosing and holding structure for solidified gas refrigerants formed of sponge rubber and providing a refrigerant receiving chamber therewithin having its entire wall surface formed by said sponge rubber.

12. An enclosing and holding structure for solidified gas refrigerants formed of sponge rubber sections removably secured together in sealed engagement and closed container forming relation.

13. In a container for solidified gas refrigerants, an insulating lining therefor formed of sponge rubber material and providing the refrigerant contacting surface of the container.

14. A container for solidified gas refrigerants, including sponge rubber sections in sealed engagement with each other forming a closed compartment having a gas escape therefrom, and means detachably securing said sections in sealed closed compartment forming relation.

15. A container for solidified gas refrigerants formed of sponge rubber material providing a refrigerant compartment in which the refrigerant is in direct contact with the sponge rubber and having a gas escape therefrom, and heat conducting material at the exterior of and in contact with said compartment forming sponge rubber material.

16. In combination, a receptacle having an opening for receiving material to be refrigerated, and a refrigerating closure for removable mounting in the receptacle opening, said closure embodying a support member for removably engaging the receptacle, and a solidified gas refrigerant receiving structure carried by and at the under side of said support member for positioning thereby within the receptacle, said structure including upper and lower insulating material sections with the lower section removable from the upper section for charging the receiving structure with refrigerant, and means removably securing the lower section in sealed relation on and with the upper section, said solidified gas receiving insulating material sections providing for escape of gas therefrom.

17. In combination, a receptacle having an open end to receive material to be refrigerated, and a refrigerating closure for the open end of said receptacle embodying a closure member for removable mounting in the open end of the receptacle, and a solidified gas refrigerant receiving and holding structure at the inner side of said closure for positioning thereby in heat exchange relation with the space within the receptacle, said refrigerant receiving and holding structure including separable heat insulating material sections forming a gas-tight refrigerant holding structure, and means removably securing and maintaining said sections in sealed, gas-tight engagement and relationship to form the refrigerant enclosing and holding structure carried by said closure member, said structure providing for escape of refrigerant gas therefrom to the exterior of the receptacle.

ERNEST DU BOIS.